United States Patent [19]

Yamashita et al.

[11] Patent Number: 5,883,157

[45] Date of Patent: Mar. 16, 1999

[54] INK JET RECORDING INK AND INK JET RECORDING METHOD

[75] Inventors: Yoshiro Yamashita; Ken Hashimoto; Hiroshi Inoue, all of Minami-ashigara, Japan

[73] Assignee: Fuji Xerox Co., Ltd., Tokyo, Japan

[21] Appl. No.: 756,485

[22] Filed: Nov. 26, 1996

[30] Foreign Application Priority Data

Dec. 7, 1995 [JP] Japan .................................. 7-318901

[51] Int. Cl.$^6$ ...................................................... C09D 5/00
[52] U.S. Cl. ............................................................ 523/161
[58] Field of Search .............................................. 523/161

[56] References Cited

U.S. PATENT DOCUMENTS 5,133,803 7/1992 Moffatt ...................................... 106/25

FOREIGN PATENT DOCUMENTS

| A-63-132083 | 6/1988 | Japan . |
| A-6-136306 | 5/1994 | Japan . |
| A-6-507445 | 8/1994 | Japan . |
| WO 93/18103 | 9/1993 | WIPO . |

*Primary Examiner*—Edward J. Cain
*Attorney, Agent, or Firm*—Oliff & Berridge, PLC

[57] ABSTRACT

Ink for ink jet recording containing water, a coloring material and a water-soluble organic solvent, containing 0.01 to 5 wt % of a polymer containing a carboxylic group or polymer having salt of a carboxylic group, having an acid value of 50 to 700; and 0.001 to 5 wt % of a surface active agent, wherein the foaming surface viscosity of the ink is 0.05 to 1.0 g/s. The polymer is a copolymer of hydrophobic α, β- unsaturated ethylene monomer and a monomer having a plurality of hydrophilic —COOM groups (wherein M is hydrogen, alkali metal, or an onium compound including ammonium ion, organic ammonium ion, phosphonium ion, sulfonium ion, oxonium ion, stibonium ion, stanonium and iodonium), a monomer having acid anhydride thereof or a monomer containing ester thereof. The ink for ink jet recording and the ink jet recording method according to the present invention provide an image having a high optical density, without unevenness and free from feathering and bleeding. Moreover, clogging of the nozzles and disorder in ink discharge can be prevented.

24 Claims, No Drawings

INK JET RECORDING INK AND INK JET RECORDING METHOD

BACKGROUND OF THE INVENTION

1. Field of the Invention

The present invention relates to ink jet recording ink and an ink jet recording method, and more particularly to ink jet recording ink and an ink jet recording method which can provide an image having a high optical density without unevenness, feathering and bleeding, clogging of the nozzles and disorder in discharging ink.

2. Description of the Related Art

A so-called ink jet recording apparatus capable of recording an image on paper, cloth or a film by discharging liquid or molten solid ink through nozzles, slits, a porous film or the like has been energetically investigated because of advantages of small size, low cost and low noise. Recently, a multiplicity of ink jet recording apparatuses capable of performing a full color recording operation have been put on the market and widely used in the field of the recording apparatus, as well as black monochrome printer capable of realizing excellent print quality on so-called plain paper, such as a report sheet and a copy sheet.

Ink for use in the ink jet recording apparatus is mainly composed of solvent, a coloring material and additives. The ink for use in the ink jet recording operation is required to satisfy:

(1) An image having a high optical density and a high resolution without unevenness and free from feathering and bleeding and fogging can be obtained on a paper sheet.
(2) The leading end of a nozzle must not be clogged with dried ink to provide good discharge responsiveness and ink discharging stability.
(3) The ink must quickly be dried on the paper sheet.
(4) The formed image must have excellent fastness.
(5) Excellent storage stability can be obtained for a long time.

As for the requirement (1), a variety of means have been developed. For example, a method has been disclosed in, for example, Japanese Patent Application Laid-Open (JP-A) No. 63-132083 in which a solid material, composed of polyethylene glycol, fatty acid and its salt, having a molecular weight of 300 or greater and arranged such that the viscosity ratio of 10% solution to 30% solution is 1:3 or higher, is used to raise the viscosity of ink so as to prevent feathering. In U.S. Pat. No. 5,133,803, a bleed preventing method has been suggested in which a colloid substance, having a high molecular weight of 10,000 or more, composed of alginic acid, carboxymethylcellulose, carrageenan and the like is used. In Japanese Patent Application Laid-Open (JP-A) No. 6-136306, a method has been suggested in which a polymeric substance having a molecular weight of 3000 to 50000 is used to make the surface tension and the viscosity of ink to be specific values so as to obtain satisfactory fixation characteristic and prevent feathering and bleeding.

Although a variety of contrivances have been suggested to prevent image feathering and bleeding, a method capable of satisfying requirements when used to record an image on a recording medium, which easily causes feathering and bleeding, has not been obtained. Moreover, a method capable of satisfying all of the other requirements which ink for ink jet recording must satisfy has not been obtained.

SUMMARY OF THE INVENTION

Accordingly, an object of the present invention is to provide ink for use in an ink jet recording operation and an ink jet recording method using the ink capable of satisfying the requirements, without an image feathering and bleeding.

The foregoing object can be achieved by ink for ink jet recording containing water, a coloring material and a water-soluble organic solvent, comprising: 0.01 to 5 wt % of a polymer containing a carboxylic group, having an acid value of 50 to 700, or a polymer having salt of a carboxylic group; and 0.001 to 5 wt % of a surface active agent, wherein foaming surface viscosity of the ink is 0.05 to 1.0 g/s.

The foregoing object can be achieved by ink for ink jet recording containing water, a coloring material and a water-soluble organic solvent, comprising: 0.01 to 5 wt % of a copolymer of a hydrophobic α, β-unsaturated ethylene monomer and a monomer having a plurality of hydrophilic —COOM groups (wherein M is hydrogen, alkali metal, or an onium compound such as ammonium ion, organic ammonium ion, phosphonium ion, sulfonium ion, oxonium ion, stibonium ion, stanonium and iodonium), a monomer having acid anhydride thereof or a monomer containing ester thereof; and 0.001 to 5 wt % of a surface active agent, wherein foaming surface viscosity of the ink is 0.05 to 1.0 g/s.

Further, the foregoing object can be achieved by an ink jet recording method in which ink for ink jet recording having the above-described characteristics is used.

Other objects, features and advantages of the invention will be evident from the following detailed description of the preferred embodiments.

DESCRIPTION OF THE PREFERRED EMBODIMENTS

The present invention will now be described in detail.

Polymer which is used for ink for ink jet recording contains carboxylic acid having an acid value of 50 to 700 or a polymer containing salt of carboxylic acid produced by neutralizing the carboxylic acid with base. It has been found that an image having a high optical density without unevenness and without feathering and bleeding is obtained by the use of a copolymer of a hydrophilic monomer having a plurality of —COOM group (wherein M is hydrogen, alkali metal, or an onium compound such as ammonium ion, organic ammonium ion, phosphonium ion, sulfonium ion, oxonium ion, stibonium ion, stanonium and iodonium), or a monomer having acid anhydride thereof or a hydrophilic monomer having ester thereof and a hydrophobic α, β-unsaturated ethylene monomer.

The copolymer of the hydrophilic monomer and the hydrophobic α, β-unsaturated ethylene monomer is exemplified by a random copolymer, a block copolymer, a graft copolymer, an alternating copolymer of dicarboxylic acid, such as maleic acid, methylmaleic acid, itaconic acid, glutaconic acid and muconic acid, tricarboxylic acid such as 1-propene-1,2,3-tricarboxylic acid, their salts, or hydrophilic vinyl compounds exemplified by acid anhydrides of the foregoing compounds; and the α, β-unsaturated ethylene compounds, such as vinyl compound monomers, such as aliphatic olefins, aromatic olefins, unsaturated carboxylic acid esters, unsaturated sulfonic acid esters, unsaturated phosphoric esters, unsaturated carboxyamides, unsaturated ketones, unsaturated nitriles and haloganated olefins. The carboxylic groups in the hydrophilic vinyl compounds may be partly esterified or aminated.

When the copolymer is added to ink, excess penetration of ink into a recording material, such as paper so that feathering and bleeding are prevented. It is preferable that the copolymer is contained by 0.01 to 5 wt %, more preferably 0.05 to 4 wt %, and more preferably 0.1 to 3 wt %. If the quantity of addition of the copolymer is less than 0.01 wt %, the effect of preventing feathering and bleeding is unsatisfactory. If it is larger than 5 wt %, nozzles for ejecting ink are easily clogged with the ink.

In light of obtaining images without unevenness and preventing clogging of the nozzles, it is preferable that the hydrophilic vinyl compound is maleic anhydride or its salt, while the hydrophobic α, β-unsaturated ethylene monomer is a copolymer of combination of materials selected from the group consisting of ethylene, propylene, isobutylene, styrene, vinyl toluene, acrylic acid ester, methacrylic acid ester, butadiene, isoprene and acrylonitrile. In particular, it is preferable that styrene-maleic anhydride (salt) copolymer is employed because of π electrons of the aromatic ring which are considered to be the cause of a preferable influence on the other ink materials. If the molar ratio of styrene to maleic anhydride is 1:1, it is considered that the styrene-maleic anhydride (salt) copolymer is present in the form of an alternating copolymer attributable to the reaction selectivity. In this condition, more preferable results can be obtained, although whether the molecular structure affects the results is uncertain.

In the case where the copolymer contain salt of carboxylic acid, the counter ion of the carboxylic acid may be monovalent cation, such as alkali metal, ammonium or an organic amine which can be handled easily. However, polyvalent cation, such as alkaline earth metal, such as calcium or magnesium, may be employed. The counter ion can be selected in light of coloring materials and solvents to be used. In general, $Li^+$, $Na^+$, $K^+$ and $NH_4^+$ have large latitudes.

It is preferable that the mean molecular weight of the copolymer is 1000 to 10000, more preferably 1000 to 3000. If the mean molecular weight of the copolymer is larger than 10000, the clogging preventing characteristic largely deteriorates though the effect of preventing feathering and bleeding is not changed considerably. If the mean molecular weight of the copolymer is less than 1000, the viscosity cannot easily be raised and thus feathering and bleeding can not be effectively prevented. It is preferable that the acid value of the copolymer is 100 to 500. If the acid value of the copolymer is larger than 500, the solubility becomes excessively high so that the copolymer cannot easily reach the surface of a drop, and therefore, the effect becomes unsatisfactory. If the acid value is less than 100, the copolymer cannot sufficiently be dissolved. When a copolymer having an acid value in the range of 300 to 500 is used in ink, ink having a surface tension of 30 mN/m or higher, preferably 40 mN/m or higher, exerts an excellent effect. When copolymer having an acid value in the range of 100 to 300 is used in ink, ink having a surface tension of 45 mN/m or lower, preferably 35 mN/m or lower, exerts an excellent effect.

It is preferable that a surface active agent according to the present invention is nonionic, anionic or ampholytic surface active agent. The surface active agent may be a usual surface active agents for use in ink for the ink jet recording operation. That is, for example, the nonionic surface active agent is exemplified by polyoxyetylenealkylphenylether, polyoxyethylenealkylether, polyoxyethylene fatty acid ester, sorbitan fatty acid ester, polyoxyethylenesorbitan fatty acid ester, polyoxyethyleneglycerine fatty acid ester, polyglycerine fatty acid ester, polyoxyethylensorbitol fatty acid ester, polyoxyethylenesterol, polyoxyethylenepolyoxypropyleneether, polyoxyethylene fatty acid amide, polyoxyethylenepolyoxypropylene block copolymer, tetramethyldecynediol, and a tetramethyldecynediol ethyleneoxide additive.

The anionic surface active agents are exemplified by alkylbenzenesulfonates, alkylphenylsulfonates, alkylnaphthalenesulfonates, higher fatty acid salts, sulfuric ester salt of higher fatty acid esters, sulfonic acid salt of higher fatty acid esters, sulfuric ester salt and sulfonic acid salt of higher alcohol ethers, higher alkyl sulfosuccinic acid salts, formalin condensate of naphthalenesulfonate, polystyrenesulfonate, polyacrylate, polyoxyethylenealkyletherphosphates, alkylethercarboxylates, alkylsulfates, acrylic acid-acrylic acid ester copolymers.

The ampholytic surface active agent may be betaines, sulfobetaines, sulfatebetaines or imidazolines. Also a silicone surface active agents, such as polysiloxane polyoxyethylene additives, or perfluoroalkylcarboxylates, perfluoroalkylsulfonates, oxyethyleneperfluoroalkylethers or bio-surfactants such as spiculisporic acid, rhamnolipid or lysolecithin, may be employed.

The surface active agents according to the present invention, similarly to the case where they are added to usual ink for ink jet recording, accelerate dissolution and stabilize dispersion of dyes or pigments. Moreover, these surface active agents enhance penetration of ink into paper and quickly dries the ink. Depending upon combination with the copolymers, the surface active agents appropriately control wetting of the ink on paper so as to prevent feathering and bleeding due to excess penetration of the ink into the paper. In addition, these surface active agents compensate decrease in the penetration speed due to thickening with the copolymer. Simultaneously, the surface active agents reach the surface of the nozzle faster than the copolymer to retard the thickening of the ink due to the copolymer at the tip end of the nozzle to contribute to improving the clogging resistance. In addition, the surface active agents improve performance of wiper-cleaning an ink jet head.

The surface active agent may be employed solely or in the form of combination. It is preferable that the surface active agent is contained by 0.001 to 5 wt %, more preferably 0.01 to 3 wt %. If the surface active agent is less than 0.001 wt %, an intended effect cannot be obtained. If it is larger than 3 wt %, excess penetration of the ink results in feathering and bleeding. In light of images without unevenness, drying characteristics, low foaming characteristic of ink and clogging resistance, it is preferable that nonionic surface active agent is employed. Nonionic surface active agents having HLB of 3 to 18 are preferable. If the HLB of the nonionic surface active agent is smaller than 3, the hydrophobic characteristic of the surface active agent is excessively high so that wetting of the surface of paper by the ink becomes excessive. As a result, the thickening effect is delayed and therefore, the effect of improving feathering and bleeding is somewhat unsatisfactory. If the HLB of a surface active agent is larger than 18, the hydrophilic characteristic is made excessive so that the surface active agent cannot easily reach the surface of the nozzle. Therefore, the interaction among the copolymers is not prevented. Thus, the effect of preventing clogging is unsatisfactory.

The foaming surface viscosity is measured by measuring the surface shear viscosity of foam of ink by foaming the ink. The measurement was performed such that about 200 ml of ink was filled into a petri dish having a diameter of about 14 cm and leveled off. Thereafter, about 10 ml of air was introduced into the ink by a syringe to foam the ink, followed by bringing a disc having a diameter of about 10 cm into contact with the surface of the ink after one minutes has elapsed from foaming, and then damping oscillation was applied thereto.

The inventors of the present invention considered that the increase in the viscosity of the surface film of the ink drop inhibits spread of ink on the surface of paper. Thus, the surface viscosity was measured without foaming the ink. However, it was found that the foaming surface viscosity was considerably correlated with the continuous flow viscosity, but was not correlated with image feathering and bleeding. However, a correlation of image feathering and bleeding with the foaming surface viscosity was found, and the fact that a foaming surface viscosity of 0.05 g/s or higher exerted a significant effect of preventing image feathering and bleeding was found. If the viscosity of the ink surface is high at the tip end of the nozzle, clogging of the nozzle with the ink easily takes place. Therefore, it is preferable that the foaming surface viscosity is 1.0 g/s or lower, more preferably 0.7 g/s or lower. More preferably, it is 0.1 to 0.5 g/s, and more preferably 0.1 to 0.4 g/s. If the usual continuous flow viscosity of ink is too low, drop of ink drop from the nozzle takes place. If it is too high, the resistance becomes too large with respect to the discharge pressure. Therefore, it is preferable that the foaming surface viscosity is 1.1 to 6.0 mPa·s.

As described above, when a polymer containing carboxylic acid having an acid value of 50 to 700, or a polymer containing salts of carboxylic acid which is produced by neutralizing the carboxylic acid with a base; or, in particular, a copolymer of a hydrophilic monomer containing a plurality of —COOM group (wherein M is hydrogen, alkali metal, onium compounds such as ammonium ion, organic ammonium ion, phosphonium ion, sulfonium ion, oxonium ion, stibonium ion, stanonium and iodonium), or a hydrophilic monomer containing acid anhydrides thereof or a hydrophilic monomer containing ester thereof and a hydrophobic α, β-unsaturated ethylene monomer, surface active agents, in particular, at least one type of surface active agents selected from the group consisting of nonionic, anionic or ampholytic surface active agents are contained in ink for ink jet recording and when the foaming surface viscosity of the ink is made to be 0.05 g/s or higher, images with a high optical density, without unevenness and free from feathering and bleeding on the surface of a recording material can be obtained. Moreover, clogging of nozzles with the ink and disorder in discharging the ink can be prevented.

When an ink jet recording operation with high resolution and small drop is performed such that a quantity of discharge per pulse is 1 ng to 100 ng, preferably 5 to 70 ng, and more preferably 5 to 40 ng, the effect of preventing feathering and bleeding can be improved significantly because the drop has a small volume and a large specific surface area. In a case of a method in which ink is discharged by imparting thermal energy to the ink, it was found that reduction in the quantity of a drop due to kogation can be prevented satisfactorily.

The coloring material may be oil emulsion colored by any one of dyes, pigments, oil-soluble dyes, pigments and colored polymer/wax. Among dyes, it is preferable that water-soluble dyes are employed. Although the water-soluble dye may be any one of acidic dyes, direct dyes, basic dyes and reactive dyes, the acidic dyes or the direct dyes are preferred. For example, any one of the following materials may be employed: C.I. direct black- 2, - 4, - 9, - 11, - 17, - 19, - 22, - 32, - 80, - 151, - 154, - 168, - 171 or - 194, C.I. direct blue- 1, - 2, - 6, - 8, - 22, - 34, - 70, - 71, - 76, - 78, - 86, - 112, - 142, - 165, - 199, - 200, - 201, - 202, - 203, - 207, - 218, - 236 and - 287, C.I. direct red- 1, - 2, - 4, - 8, - 9, - 11, - 13, - 15, - 20, - 28, - 31, - 33, - 37, - 39, - 51, - 59, - 62, - 63, - 73, - 75, - 80, - 81, - 83, - 87, - 90, - 94, - 95, - 99, - 101, - 110, - 189, and - 227, C.I. direct yellow- 1, - 2, - 4, - 8, - 11, - 12, - 26, - 27, - 28, - 33, - 34, - 41, - 44, - 48, - 58, - 86, - 87, - 88, - 135, - 142 and - 144, C.I. food black- 1 or - 2, C.I. acid black- 1, - 2, - 7, - 16, - 24, - 26, - 28, - 31, - 48, - 52, - 63, - 107, - 112, - 118, - 119, - 121, - 156, - 172, - 194 and - 208, C.I. acid blue- 1, - 7, - 9, - 15, - 22, - 23, - 27, - 29, - 40, - 43, - 55, - 59, - 62, - 78, - 80, - 81, - 83, - 90, - 102, - 104, - 111, - 185, - 249 and - 254, C.I. acid red - 1, - 4, - 8, - 13, - 14, - 15, - 18, - 21, - 26, - 35, - 37, - 52, - 110, - 144, - 180, - 249 and - 257, C.I. acid yellow- 1, - 3, - 4, -7, - 11, - 12, - 13, - 14, - 18, - 19, - 23, - 25, - 34, - 38, - 41, - 42, - 44, -53, - 55, - 61, - 71, - 76, -78, - 79 and - 122.

It is preferable that the content of the dye is 0.1 to 20 wt % with respect to the total quantity of ink, more preferably 1 to 10 wt %, and most preferably 1 to 5 wt %. If the content of the dye is too high, the clogging characteristic deteriorates when water vaporizes at the leading end of the nozzle. If the content is too low, sufficient density of the image cannot, of course, be obtained. Although the dye may be employed solely, they may be combined or, in addition to the four primary colors, cyan, magenta, yellow and black, it may be colored into custom color, such as red, blue or green.

Pigments may be employed. Any of the following pigments may be employed with a dispersant to form a pigment dispersed ink: carbon black, brilliant carmin BS, lake carmin FB, brilliant fast scarlet, disazoyellow, permanent red R, quinacridone magenta, fast yellow 10G, phthalocyanine blue, blue lake, yellow lake and rhodamine lake.

The pigment dispersion agents which are generally used may be used. For example, naphthalene sulfonic acid formalin condensate, methacrylic acid-methacrylate copolymer or the styrene-maleic anhydride copolymer according to the present invention may be employed. When the above material is used as a dispersant, it must be added to the quantity intended to achieve the object of the present invention. When the pigment dispersion process is performed, the quantity for use as the pigment dispersant and the quantity intended to achieve the present invention may be used altogehter. As an alternative to this, the quantity for use as the pigment dispersant may added so as to be adsorbed to the surface of the pigment, and then the quantity for achieving the present invention may next be added.

A water-soluble organic solvent is often used to prevent evaporation of water in the ink for ink jet recording. It is any one of the following materials: polyalcohols, such as ethylene glycol, diethylene glycol, propylene glycol, polyethylene glycol, triethylene glycol, glycerin, trimethylol propane, 1, 2, 6-hexanetriol, 1, 5-pentanediol, and dipropyleneglycol; glycol ethers, such as ethyleneglycolmonomethylether, ethyleneglycolmonoethylether, ethyleneglycol monobutylether, diethyleneglycol monomethylether, diethyleneglycol monoethylether, diethyleneglycol monobutylether, propyleneglycol monomethylether or propyleneglycol monobutylether; solvents containing sulfur, such as thiodiethanol, 2-mercaptoethanol, thioglycerol, sulfolane and dimethylsulfoxide; solvents containing nitrogen, such as 2-pyrrolidone, N-methyl-2-pyrrolidone, cyclohexylpyrrolidone, triethanolamine and diethanolamine.

In view of preventing clogging of the nozzle with ink, it is preferable that the solvent containing sulfur or nitrogen is employed. Each of the materials may be employed solely or their combination may be employed. If the water-soluble organic solvent is excessively contained in ink, the viscosity of the ink is increased so that the discharge stability and discharge response property are deteriorated. Therefore, it is preferable that the content of the solvent in ink is about 1 to about 60 wt %, more preferably about 5 to about 40 wt %.

pH adjusting agents can be used which may be an acid, such as hydrochloric acid, sulfuric acid, nitric acid, acetic acid, citric acid, oxalic acid, maleic acid, boric acid, phosphoric acid, phosphorous acid or lactic acid; which may be a base, such as sodium hydroxide, potassium hydroxide, lithium hydroxide or ammonia; which may be various types of buffers such as phosphoric acid salts, oxalic acid salts and amine salts. It is preferable that pH of the ink according to the present invention is 4 to 12, more preferably 5 to 11 in view of improving the solubility of vinyl polymer and preventing corrosion of head and cartridge members. As other solubilizing agents, urea, thiourea or acetoamide may be contained. As the physical property adjuster, polyethylene imine, polyamines, polyvinylpyrrolidone, polyethylene glycol or cellulose derivatives may be employed. As a clathrate compound, cyclodextrine, polycyclodextrine, a macrocyclic amine, crownether may be employed. If necessary, a mildewproofing agent, biocide, rust preventives, anti-oxidizing agent and cheleting agent may be contained in the ink.

As described above, the ink contains water, the water-soluble organic solvent and the coloring material as the essential components. The ink further contains a copolymer of a hydrophilic monomer and a hydrophobic α, β-unsaturated ethylenemonomer by 0.01 to 5 wt % and a surface active agent by 0.001 to 5 wt %, and the foaming surface viscosity of the ink is 0.05 to 1.0 g/s. By using the ink, images having a high optical density without unevenness and free from feathering and bleeding on a recording material can be obtained. Moreover, clogging of nozzles with the ink and disorder in discharging the ink can be prevented.

Although the mechanism for preventing feathering and bleeding by adding the above-described copolymer has not been cleared yet, it can be considered that rise in the viscosity due to evaporation of water from the surface of each ink drop prevents excessive penetration. If the foaming surface viscosity of the ink is 0.05 to 0.1 g/s, the viscosity can easily be raised and feathering and bleeding can satisfactorily be prevented. In particular, copolymers containing a monomer having a plurality of —COOM group (wherein M is hydrogen, alkali metal, or onium compounds such as ammonium ion, organic ammonium ion, phosphonium ion, sulfonium ion, oxonium ion, stibonium ion, stanonium and iodonium), a monomer having acid anhydride thereof or a monomer containing ester thereof exert their remarkable effects. The reason for this can be considered that two adjacent carboxylic groups formed by a partial disassociation of plural carboxylic groups or acid anhydrides under an alkali condition may form a type of complex state with metal cation contained in the recording material and the viscosity is raised. Alternatively, it is considered that the copolymer may be fixed in the paper owing to the hydrogen bonding force among the plural carboxylic groups and hydroxyl groups in cellulose, and the hydrophobic portion may be directed to pores in the paper, and the hydrophobic groups may have an effect of shedding water similarly to a sizing agent so that excess penetration of ink into the paper could be prevented.

The mechanism for further preventing feathering and bleeding by combining the copolymer and the surface active agent can be considered that the affinity between the surface active agent and the copolymer causes the two types of the substances to exist adjacently to appropriately control the penetration force of the surface active agent and the surface active agent realizes a state in which molecules of the copolymer gather at the surface of an ink droplet so that the thickening effect can easily be exhibited. The effect of improving the clogging by combining the copolymer with the surface active agent can be considered that water is evaporated from the surface of the ink nozzle and thus the copolymer forms a surface layer to raise the viscosity, but the surface active agent can easily reach on the surface of the nozzle and exists among the copolymer molecules so that the mutual interaction among the copolymer molecules is weakened and rapid rise in the viscosity is prevented. The mechanism of obtaining remarkable results in a case where a high resolution and small drop printing in the range of 1 to 100 ng is considered that further thickening and sizing effects can easily be obtained on the surface of the ink drop because the ratio of the surface area to the volume of the ink drop is increased as the discharging quantity of the ink is reduced. The kogation inhibiting mechanism by the materials according to the present invention is considered that low-soluble substances, such as impurities contained in the ink materials, are dissolved and stabilized in the ink by an emulsifying effect thereof so that the kogation can be prevented.

EXAMPLES

Examples and comparative examples will now be described.

Example 1

| | |
|---|---|
| C.I. Acid Blue 9 | 2 parts by weight |
| Nonionic surface active agent (Surfynol 465 manufactured by Nissin Kagaku) | 0.1 part by weight |
| Styrene-maleic anhydride Na salt copolymer (mean molecular weight: 1600, styrene/maleic anhydride = 1/1, acid value: about 480) | 1 part by weight |
| Thiodiethanol | 15 parts by weight |
| Pure water | 85 parts by weight |

The foregoing components were sufficiently mixed and dissolved, and thereafter, filtered by using a 0.45 μm filter under pressure to prepare ink.

Example 2

| | |
|---|---|
| C.I. Acid Blue 9 | 2 parts by weight |
| Nonionic surface active agent (oxyethyleneoleylether) | 0.05 part by weight |
| Styrene-maleic anhydride Li salt copolymer (mean molecular weight: 1900, styrene/maleic anhydride = 3/1, acid value: about 280) | 0.5 part by weight |
| Thiodiethanol | 15 parts by weight |
| Pure water | 85 parts by weight |

The foregoing components were sufficiently mixed and dissolved, and thereafter, filtered by using a 0.45 μm filter under pressure to prepare ink.

Comparative Example 1

| | |
|---|---|
| C.I. Acid Blue 9 | 2 parts by weight |
| Thiodiethanol | 15 parts by weight |
| Pure water | 80 parts by weight |

The foregoing components were sufficiently mixed and dissolved, and thereafter, filtered by using a 0.45 μm filter under pressure to prepare ink.

Comparative Example 2

| | |
|---|---|
| C.I. Acid Blue 9 | 2 parts by weight |
| Nonionic surface active agent (Surfynol 465 manufactured by Nissin Kagaku) | 0.1 part by weight |
| Thiodiethanol | 15 parts by weight |
| Pure water | 80 parts by weight |

The foregoing components were sufficiently mixed and dissolved, and thereafter, filtered by using a 0.45 μm filter under pressure to prepare ink.

Comparative Example 3

| | |
|---|---|
| C.I. Acid Blue 9 | 2 parts by weight |
| Styrene-maleic anhydride ammonium salt copolymer (mean molecular weight: 1600, styrene/maleic anhydride = 1/1, acid value: about 480) | 1 part by weight |
| Thiodiethanol | 15 parts by weight |
| Pure water | 80 parts by weight |

The foregoing components were sufficiently mixed and dissolved, and thereafter, filtered by using a 0.45 μm filter under pressure to prepare ink.

Evaluation of Ink (1) Surface Tension of Ink

Surface tension was measured at a temperature of 23° C. and relative humidity of 55% by using a Wilhelmy surface tension meter.

(2) Viscosity of Ink

The viscosity was measured at a temperature of 23° C. and relative humidity of 55% at a shearing speed of 1,400 $s^{-1}$.

(3) Foaming Surface Viscosity of Ink

The foaming surface viscosity was measured at a temperature of 23° C. and relative humidity of 55% by using an automatic surface visco-elasticity meter (SVR-A) manufactured by Kyowa such that foamed ink was subjected to a damping oscillation method.

(4) pH of Ink pH was measured at a temperature of 23° C. and relative humidity of 55% by using a glass pH electrode.

(5) Quantity of Ink Drop

A trial-manufactured head was used at a temperature of 23° C. and relative humidity of 55% such that discharge of an ink drop of ¼ tone (2035×128 pulses) was performed three times at a frequency of 6 kHz. The ink was received by a small piece of an ink absorber to weigh the ink so that the quantity of discharge per pulse was determined by calculations.

(6) Image Quality Test

Printing tests of the prepared ink were performed by using a thermal ink jet printer which was trially manufactured for evaluation and which had a resolution of 600 dpi such that a solid image and one dot line were printed on each of two types (high and low sized papers) of paper FX-L (manufactured by Fuji Xerox) employed as typical plain paper. Feathering of a line, thickening of line, optical density of the solid image and uniformity of edges were evaluated as follows:

(a) Feathering of Line
 A: no feathering
 B: somewhat feathering took place
 C: feathering took place in many portions portions (b) Thickening of Line
 A: 70 μm or thinner
 B: 70 to 100 μm
 C: 100 μm or thicker (c) Optical Density of Solid Image
 A: In an allowable range
 C: Unsatisfactory (d) Uniformity of Solid Image
 A: Satisfactory
 B: Somewhat disorder took place
 C: Rough and unsatisfactory smoothness (7) Clogging Resistance Test Prepared ink was discharged from a trially manufactured thermal ink jet printer having a resolution of 600 dpi, and then allowed to stand in an environment that temperature was 23° C. and the relative humidity was 55% without a cap after stopping discharge of the ink. Standing period until disorder of an image occurred when discharge of the ink was restarted was measured. Evaluation criteria was as follows.

A: 1 minute or longer
 B: 0.5 minute to 1 minute
 C: shorter than 0.5 minute (8) Drying Time Test Plain paper FX-L (manufactured by Fuji Xerox) was employed to print a uniform solid image having size of 40 mm×10 mm, followed by placing a coat paper for ink jet recording on the solid image under pressure of 100 g. The period until the ink of the solid image was not transferred onto the surface of the coat paper was measured. Evaluation criteria were as follows:

A: 60 seconds or shorter
 B: 60 to 120 seconds
 C: 120 seconds or longer Results are shown in Table 1.

TABLE 1

| | Ex. 1 | Ex. 2 | Comp. Ex. 1 | Comp. Ex. 2 | Comp. Ex. 3 |
|---|---|---|---|---|---|
| Surface Tension of Ink (mN/m) | 40 | 35 | 48 | 35 | 46 |
| Viscosity of Ink (mPas) | 1.8 | 1.8 | 1.7 | 1.7 | 1.8 |
| Foaming Surface Viscosity of Ink (g/s) | 0.24 | 0.17 | 0.04 | 0.07 | 0.15 |
| pH of Ink | 9.1 | 8.6 | 6.5 | 6.5 | 8.9 |
| Quantity of Ink Drop (ng) | 25 | 24 | 27 | 26 | 25 |
| Image Quality Test a) Feathering of Line | A(A) | A(A) | C(B) | C(C) | C(A) |
| Image Quality Test b) Thickening of Line | A(A) | A(A) | B(A) | C(A) | A(A) |
| Image Quality Test c) Density of Solid Image | A(A) | A(A) | A(A) | C(A) | A(A) |
| Image Quality Test d) Uniformity of Solid Image | A(A) | A(A) | C(A) | C(B) | B(A) |
| Clogging Resistance Test | A | A | A | A | C |
| Drying Time Test | A | A | B | A | C |

*Evaluations in parentheses are those resulted with highly sized paper.

Example 3

| | |
|---|---|
| C.I. Direct Black 168 | 3 parts by weight |
| Glycerin | 20 parts by weight |
| Styrene-maleic anhydride potassium salt copolymer (mean molecular weight: 1800, styrene/maleic anhydride = 2/1, acid value: about 350) | 2 parts by weight |
| Nonionic surface active agent (oxyethylenelaurylphenylether) | 0.5 part by weight |
| Pure water | 80 parts by weight |

The foregoing components were sufficiently mixed and dissolved, and thereafter, filtered by using a 0.45 μm filter under pressure to prepare ink. The foaming surface viscosity was 0.37 g/s, viscosity was 2.2 mPas, surface tension was 38 mN/m, pH was 8.6, and quantity of an ink drop of the ink was 23 ng. Results of the image quality test, clogging resistance test and drying time test were satisfactory.

Example 4

| C.I. Direct Yellow 144 | 3 parts by weight |
|---|---|
| Diethylene glycol | 20 parts by weight |
| Butylcarbitol | 5 parts by weight |
| Styrene-maleic anhydride Na salt copolymer (mean molecular weight: 1700, styrene/maleic anhydride = 1/1, acid value: about 270 | 1.5 parts by weight |
| Nonionic surface active agent (Pluronic 6400 manufactured by BASF) | 1 part by weight |
| Pure water | 70 parts by weight |

The foregoing components were sufficiently mixed and dissolved, and thereafter, filtered by using a 0.45 μm filter under pressure to prepare ink. The foaming surface viscosity was 0.33 g/s, viscosity was 2.6 mPas, surface tension was 36 mN/m, pH was 8.8, and quantity of an ink drop of the ink was 24 ng. Results of the image quality test, clogging resistance test and drying time test were satisfactory.

Example 5

| C.I. Direct Blue 199 | 3 parts by weight |
|---|---|
| Ethyleneglycol | 10 parts by weight |
| Na laurylsulfate (anionic surface active agent) | 0.1 part by weight |
| Styrene-maleic anhydride Li salt copolymer (mean molecular weight: 3000, styrene/maleic anhydride = 1/1, acid value: about 480 | 0.3 parts by weight |
| Pure water | 85 parts by weight |

The foregoing components were sufficiently mixed and dissolved, and thereafter, filtered by using a 0.45 μm filter under pressure to prepare ink. The foaming surface viscosity was 0.08 g/s, viscosity was 1.4 mPas, surface tension was 38 mN/m, pH was 7.9, and quantity of an ink drop of the ink was 32 ng. Results of the image quality test, clogging resistance test and drying time test were satisfactory.

Example 6

| X-38 Black Dye manufactured by BASF | 4 parts by weight |
|---|---|
| Thiodiethanol | 5 parts by weight |
| Glycerin | 10 parts by weight |
| Nonionic surface active agent (polyoxyethyleneoctylphenylether) | 0.05 part by weight |
| Styrene-maleic anhydride ammonium salt copolymer (mean molecular weight: 2400, styrene/maleic anhydride = 2/1, acid value: about 240 | 1.0 part by weight |
| Pure water | 80 parts by weight |

The foregoing components were sufficiently mixed and dissolved, and thereafter, filtered by using a 0.45 μm filter under pressure to prepare ink. The foaming surface viscosity was 0.16 g/s, viscosity was 1.8 mPas, surface tension was 38 mN/m, pH was 8.2, and quantity of an ink drop of the ink was 28 ng. Results of the image quality test, clogging resistance test and drying time test were satisfactory.

Example 7

| C.I. Direct Black 154 | 3 parts by weight |
|---|---|
| Sulfolane | 15 parts by weight |
| Nonionic surface active agent (Pluronic 3100 manufactured by BASF) | 1.5 parts by weight |
| Styrene-maleic anhydride triethanolamine salt copolymer (mean molecular weight: 1800, styrene/maleic anhydride = 3/1, acid value: about 220 | 1.0 part by weight |
| Pure water | 80 parts by weight |

The foregoing components were sufficiently mixed and dissolved, and thereafter, filtered by using a 0.45 μm filter under pressure to prepare ink. The foaming surface viscosity was 0.22 g/s, viscosity was 1.9 mPas, surface tension was 34 mN/m, pH was 8.4, and quantity of an ink drop of the ink was 24 ng. Results of the image quality test, clogging resistance test and drying time test were satisfactory.

Example 8

| C.I. Food Black 2 | 3 parts by weight |
|---|---|
| Thiodiethanol | 15 parts by weight |
| Diethyleneglycolmonohexylether | 5 parts by weight |
| Urea | 5 parts by weight |
| Styrene-maleic anhydride Ca salt copolymer (mean molecular weight: 2800, styrene/maleic anhydride = 1/1, acid value: about 240 | 2.0 parts by weight |
| Nonionic surface active agent (oxyethyleneoleylether) | 0.1 part by weight |
| Pure water | 70 parts by weight |

The foregoing components were sufficiently mixed and dissolved, and thereafter, filtered by using a 0.45 μm filter under pressure to prepare ink. The foaming surface viscosity was 0.45 g/s, viscosity was 2.8 mPas, surface tension was 31 mN/m, pH was 8.7, and quantity of an ink drop of the ink was 20 ng. Results of the image quality test, clogging resistance test and drying time test were satisfactory.

Example 9

| C.I. Direct Red 227 | 2 parts by weight |
|---|---|
| N-methyl-2-pyrrolidone | 10 parts by weight |
| Nonionic surface active agent (polyoxyethylenesorbitan fatty acid ester) | 0.05 part by weight |
| Styrene-maleic anhydride Na salt copolymer (mean molecular weight: 1700, styrene/maleic anhydride = 1/1, acid value: about 290 | 3.0 parts by weight |
| Pure water | 85 parts by weight |

The foregoing components were sufficiently mixed and dissolved, and thereafter, filtered by using a 0.45 μm filter under pressure to prepare ink. The foaming surface viscosity was 0.35 g/s, viscosity was 1.5 mPas, surface tension was 43 mN/m, pH was 7.5, and quantity of an ink drop of the ink was 30 ng. Results of the image quality test, clogging resistance test and drying time test were satisfactory.

Example 10

| | |
|---|---|
| Dye PROJET. FAST. Black. 2 (manufactured by ZENEKA) | 3 parts by weight |
| 2-pyrrolidone | 15 parts by weight |
| Urea | 5 parts by weight |
| Nonionic surface active agent (Fluorad FC-104 manufactured by 3M) | 0.01 part by weight |
| Isobutylene-maleic anhydride Na salt copolymer (mean molecular weight: 6000, isobutylene/maleic anhydride = 2/1, acid value: about 500 | 1.0 part by weight |
| Pure water | 75 parts by weight |

The foregoing components were sufficiently mixed and dissolved, and thereafter, filtered by using a 0.45 μm filter under pressure to prepare ink. The foaming surface viscosity was 0.08 g/s, viscosity was 1.9 mPas, surface tension was 28 mN/m, pH was 8.7, and quantity of an ink drop of the ink was 28 ng. Result of the image quality test was allowable, and those of the clogging resistance test and drying time test were satisfactory.

Example 11

| | |
|---|---|
| C.I. Direct Yellow 86 | 2 parts by weight |
| 2-pyrrolidone | 5 parts by weight |
| Thiodiethanol | 5 parts by weight |
| Laurylbetaine (amphoteric surface active agent) | 2 parts by weight |
| Polyvinylalcohol (polymerization degree: 500) | 0.1 part by weight |
| Methylmethacrylate-maleic anhydride Li salt copolymer (mean molecular weight: 2500, methylmethacrylate/maleic anhydride = 2/1, acid value: about 360) | 1.0 part by weight |
| Pure water | 85 parts by weight |

The foregoing components were sufficiently mixed and dissolved, and thereafter, filtered by using a 0.45 μm filter under pressure to prepare ink. The foaming surface viscosity was 0.17 g/s, viscosity was 1.8 mPas, surface tension was 41 mN/m, pH was 7.8, and quantity of an ink drop of the ink was 30 ng. Results of the image quality test, clogging resistance test and drying time test were satisfactory.

Example 12

| | |
|---|---|
| C.I. Acid Red 52 | 3 parts by weight |
| Thiodiethanol | 10 parts by weight |
| Ethyleneglycol | 5 parts by weight |
| Polysiloxane polyoxyethylene adduct (Nonionic surface active agent) | 0.2 part by weight |
| Acrylic acid-methylmethacrylate ammonia salt copolymer (mean molecular weight: 3000, acrylic acid-methylmethacrylate = 2/1, acid value: about 450 | 1 part by weight |
| Pure water | 80 parts by weight |

The foregoing components were sufficiently mixed and dissolved, and thereafter, filtered by using a 0.45 μm filter under pressure to prepare ink. The foaming surface viscosity was 0.16 g/s, viscosity was 1.9 mPas, surface tension was 31 mN/m, pH was 7.3, and quantity of an ink drop of the ink was 25 ng. Results of (b: thickening of line) and (c: density of solid image) of the image quality test were satisfactory, those of (a: feathering of line) and (d: uniformity of solid image) were allowable and those of the clogging resistance test and drying time test were satisfactory.

Example 13

| | |
|---|---|
| C.I. Acid Yellow 23 | 2 parts by weight |
| 1,5-pentanediol | 10 parts by weight |
| Lauryldimethylammoniumoxide (amphoteric surface active agent) | 2 parts by weight |
| Styrene-maleic anhydride Li salt copolymer (mean molecular weight: 7000, styrene/maleic anhydride = 2/1, acid value: about 350 | 1.5 parts by weight |
| Pure water | 85 parts by weight |

The foregoing components were sufficiently mixed and dissolved, and thereafter, filtered by using a 0.45 μm filter under pressure to prepare ink. The foaming surface viscosity was 0.56 g/s, viscosity was 1.9 mPas, surface tension was 41 mN/m, pH was 9.2, and quantity of an ink drop of the ink was 30 ng. Results of the image quality test and drying time test were satisfactory and that of the clogging resistance test was allowable.

Example 14

| | |
|---|---|
| Carbon black | 4 parts by weight |
| Anionic surface active agent (sodium naphthalenesulfonate formalin condensate) | 1 part by weight |
| Thiodiethanol | 10 parts by weight |
| Ethyleneglycol | 5 parts by weight |
| Styrene-maleic anhydride Li salt copolymer (mean molecular weight: 1900, styrene/maleic anhydride = 3/1, acid value: about 280 | 1 part by weight |
| Pure water | 80 parts by weight |

Carbon black dispersion was prepared by using carbon black, sodium naphthalenesulfonate formalin condensate and pure water. Then, the other components were sufficiently mixed with the dispersion, and thereafter, filtered by using a 1 μm filter under pressure to prepare ink. The foaming surface viscosity was 0.35 g/s, viscosity was 2.3 mPas, surface tension was 36 mN/m, pH was 7.5, and quantity of an ink drop of the ink was 25 ng. Results of the image quality test, clogging resistance test and drying time test were satisfactory.

Example 15

| | |
|---|---|
| Carbon black | 5 parts by weight |
| Acrylic acid-methacrylic acid-methylmethacrylate copolymer | 3 parts by weight |
| Diethyleneglycol | 15 parts by weight |
| Surfynol (Nonionic surface active agent) | 0.1 part by weight |
| Styrene-maleic anhydride Na salt copolymer (mean molecular weight: 1600, styrene/maleic anhydride = 1/1, acid value: about 480 | 1 part by weight |
| Pure water | 70 parts by weight |

Carbon black dispersion was prepared by using carbon black, acrylic acid-methacrylic acid-methylmethacrylate copolymer and pure water. Then, the other components were sufficiently mixed with the dispersion, and thereafter, filtered by using a 1 μm filter under pressure to prepare ink. The foaming surface viscosity was 0.19 g/s, viscosity was 2.2 mPas, surface tension was 38 mN/m, pH was 8.5, and quantity of an ink drop of the ink was 32 ng. Results of the image quality test, clogging resistance test and drying time test were satisfactory.

Example 16

| Carbon black | 5 parts by weight |
|---|---|
| Acrylic acid-methylmethacrylate copolymer | 2 parts by weight |
| Glycerine | 10 parts by weight |
| Sodium alkylbenzenesulfonic acid (anionic surface active agent) | 0.05 part by weight |
| Styrene-maleic anhydride Li salt copolymer (mean molecular weight: 2500, styrene/maleic anhydride = ⅔, acid value: about 350 | 0.5. part by weight |
| Pure water | 80 parts by weight |

Carbon black dispersion was prepared by using carbon black, acrylic acid-methylmethacrylate copolymer and pure water. Then, the other components were sufficiently mixed with the dispersion, and thereafter, filtered by using a 1 μm filter under pressure to prepare ink. The foaming surface viscosity was 0.37 g/s, viscosity was 1.8 mPas, surface tension was 41 mN/m, pH was 7.9, and quantity of an ink drop of the ink was 34 ng. Results of the image quality test, clogging resistance test and drying time test were satisfactory.

Comparative Example 4

| C.I. Reactive Red 180 | 4 parts by weight |
|---|---|
| Ethylene glycol | 15 parts by weight |
| Carboxymethylcellulose (mean molecular weight: 30000, acid value: about 160) | 0.5 part by weight |
| Oxyethylenephenyllaurylether | 0.5 part by weight |
| Pure water | 80 parts by weight |

The foregoing components were sufficiently mixed and dissolved, and thereafter, filtered by using a 0.45 μm filter under pressure to prepare ink. The foaming surface viscosity was 1.2 g/s, viscosity was 5.7 mPas, surface tension was 40 mN/m, pH was 6.8, and quantity of an ink drop of the ink was 19 ng. A result of (a: feathering of line) of the image quality test was allowable, but those of the drying time test and clogging resistance test were unsatisfactory.

Example 17

Ink according to Example 4, cyan and magenta ink obtained by replacing the dye according to Example 4 by C.I. Acid Blue 9 and C.I Acid Red 52 and ink according to Example 6 were evaluated as follows.

(9) Superposition Image Quality Test

A printing test was performed by using a thermal ink jet printer manufactured for evaluation and having a resolution of 600 dpi with paper FX-L (manufactured by Fuji Xerox) employed as typical plain paper such that one black dot line was printed on a color background and a solid image pattern in which different color portions were disposed adjacently was printed. Feathering and bleeding of a line and uniformity of the adjacent portions in the solid image were examined. Evaluation criteria were as follows.

(a) Bleeding of Line
  A: No bleeding
  B: Slight bleeding took place
  C: Many whisker-like bleeding portions were found
(b) Uniformity of Solid Image
  A: No disorder
  B: Slight Disorder took place
  C: Rough and unsatisfactory smoothness Results of (a) and (b) were satisfactory.

Example 18

Ink having the same composition as that of Example 4 except for styrene-maleic anhydride Na salt copolymer being omitted, cyan ink obtained by replacing the dye in the ink with C.I. Acid Blue 9 and magenta ink obtained by replacing the dye with C.I. Acid Red 52, and ink according to Example 15 were subjected to the superposition image quality test similar to that of Example 17.

Results of the line feathering and bleeding test (a) were satisfactory and results of the solid uniformity test (b) were allowable.

Example 19

| C.I. Direct Black 168 | 4 parts by weight |
|---|---|
| Diethylene glycol | 15 parts by weight |
| Styrene-maleic anhydride Na salt copolymer (mean molecular weight: 4000, styrene/maleic anhydride = ⅔, acid value: about 330) | 1 part by weight |
| Oxyethylenestearylether | 0.5 part by weight |
| Pure water | 80 parts by weight |

The foregoing components were sufficiently mixed and dissolved, and thereafter, filtered by using a 0.45 μm filter under pressure to prepare ink. The foaming surface viscosity was 0.75 g/s, viscosity was 1.7 mPas, surface tension was 38 mN/m, pH was 7.0, quantity of an ink drop of the ink was 24 ng. Results of the image quality test and the drying time test were satisfactory and that of the clogging resistance test was allowable.

Example 20

| C.I. Direct Black 168 | 4 parts by weight |
|---|---|
| Diethylene glycol | 20 parts by weight |
| Styrene-maleic anhydride Na salt copolymer (mean molecular weight: 3000, styrene/maleic anhydride = 4/1, acid value: about 80) | 2 parts by weight |
| Oxyethylenestearylether | 0.5 part by weight |
| Pure water | 80 parts by weight |

The foregoing components were sufficiently mixed and dissolved, and thereafter, filtered by using a 0.45 μm filter under pressure to prepare ink. The foaming surface viscosity was 0.45 g/s, viscosity was 2.1 mPas, surface tension was 38 mN/m, pH was 7.5, and quantity of an ink drop of the ink was 26 ng. Results of (a: feathering of line), (b: thickening of line) and (c: density of solid image) of the image quality test and the drying time test were satisfactory and (d: uniformity of solid image) of the image quality test and the clogging resistance test were allowable.

Example 21

| | |
|---|---|
| C.I. Direct Yellow 144 | 4 parts by weight |
| Glycerin | 10 parts by weight |
| Triethyleneglycolmonobutylether | 3 parts by weight |
| Maleic anhydride copolymer (mean molecular weight: 5500, acid value: about 670) | 1.5 parts by weight |
| Pluronic 4200 manufactured by BASF | 0.1 part by weight |
| KOH | 1.0 part by weight |
| Pure water | 81 parts by weight |

The foregoing components were sufficiently mixed and dissolved, and thereafter, filtered by using a 0.45 μm filter under pressure to prepare ink. The foaming surface viscosity was 0.21 g/s, viscosity was 1.6 mPas, surface tension was 37 mN/m, pH was 8.1, and quantity of an ink drop of the ink was 28 ng. Results of (b: thickening of line) and (d: uniformity of solid image) of the image quality test and the clogging resistance test were satisfactory and (a: feathering of line) and (c: density of solid image) of the image quality test and the drying time test were allowable.

Comparative Example 5

| | |
|---|---|
| Carbon black | 5 parts by weight |
| Sodium naphthalenesulfonate formalin condensate | 1 part by weight |
| 2-pyrrolidone | 15 parts by weight |
| Butylacrylate-acrylic acid Li salt copolymer (mean molecular weight: 4200, butylacrylate/acrylic acid = 10/1, acid value: about 40) | 1 part by weight |
| Surfynol 465 | 0.1 part by weight |
| Pure water | 80 parts by weight |

Carbon black dispersion was prepared by using carbon black, butylacrylate-acrylic acid Li salt copolymer and pure water. Then, the other components were sufficiently mixed with the dispersion, and thereafter, filtered by using a 1 μm filter under pressure to prepare ink. The foaming surface viscosity was 0.28 g/s, viscosity was 1.7 mPas, surface tension was 37 mN/m, pH was 8.2, and quantity of an ink drop of the ink was 31 ng. A precipitate was observed in the prepared ink during storage of the ink, and therefore, the jetting test could not be performed.

Example 22

| | |
|---|---|
| C.I. Direct Yellow 154 | 4 parts by weight |
| Ethyleneglycol | 20 parts by weight |
| Styrene-Maleic anhydride Na salt copolymer (mean molecular weight: 20000, styrene/maleic anhydride = 1/1, acid value: about 450) | 2 parts by weight |
| Sorbitan fatty acid ester | 0.5 part by weight |
| Pure water | 73 parts by weight |

The foregoing components were sufficiently mixed and dissolved, and thereafter, filtered by using a 0.45 μm filter under pressure to prepare ink. The foaming surface viscosity was 0.85 g/s, viscosity was 2.2 mPas, surface tension was 38 mN/m, pH was 8.1, and quantity of an ink drop of the ink was 24 ng. Results of (a: feathering of line) and (d: uniformity of solid image) of the image quality test were satisfactory and (b: thickening of line) and (c: density of solid image) of the image quality test, the drying time test and the clogging resistance test were allowable.

Comparative Example 6

| | |
|---|---|
| C.I. Direct Blue 86 | 4 parts by weight |
| Dipropyleneglycol | 15 parts by weight |
| Sodium laurylphosphate | 0.1 part by weight |
| Styrene-Maleic anhydride Na salt copolymer (mean molecular weight: 3000, styrene/maleic anhydride = 1/1, acid value: about 480) | 8 parts by weight |
| Pure water | 73 parts by weight |

The foregoing components were sufficiently mixed and dissolved, and thereafter, filtered by using a 0.45 μm filter under pressure to prepare ink. The foaming surface viscosity was 0.7 g/s, viscosity was 3.2 mPas, surface tension was 38 mN/m, pH was 8.5, and quantity of an ink drop of the ink was 20 ng. Results of the image quality test were satisfactory, the result of the drying time test was allowable, but the result of the clogging resistance test was unsatisfactory.

Comparative Example 7

| | |
|---|---|
| Dye PROJET. FAST. Magenta 2 manufactured by ZENEKA | 3 parts by weight |
| Triethyleneglycol | 15 parts by weight |
| Dipropyleneglycol monoethylether | 5 parts by weight |
| Oxyethylenenonylphenylether | 7 parts by weight |
| Styrene-Maleic anhydride Na salt copolymer (mean molecular weight: 1700, styrene/maleic anhydride = 1/1, acid value: about 290) | 3.0 parts by weight |
| Pure water | 67 parts by weight |

The foregoing components were sufficiently mixed and dissolved, and thereafter, filtered by using a 0.45 μm filter under pressure to prepare ink. The foaming surface viscosity was 1.1 g/s, viscosity was 3.4 mPas, surface tension was 34 mN/m, pH was 7.7, and quantity of an ink drop of the ink was 18 ng. The result of the drying time test was satisfactory, the results of (c: density of solid image) and (d: uniformity of solid image) of the image quality test were allowable, but those of (a: feathering of line) and (b: thickening of line) of the image quality test and the clogging resistance test were unsatisfactory.

As can be understood from the embodiments, the ink for ink jet recording and the ink jet recording method according to the present invention have the above-described constitution, and provide an image having a high optical density without unevenness and feathering and bleeding, and further without clogging of nozzles with the ink and disorder in ink discharge.

What is claimed is:

1. Ink for ink jet recording containing water, a coloring material and a water-soluble organic solvent, comprising:

0.01 to 5 wt % of at least one of polymer containing a carboxylic group and polymer having salt of a carboxylic group, having an acid value of 50 to 700; and 0.001 to 5 wt % of a surface active agent, wherein foaming surface viscosity of said ink is 0.1 to 1.0 g/s.

2. Ink for ink jet recording according to claim 1, wherein the mean molecular weight of said polymer is 1000 to 10000.

3. Ink for ink jet recording according to claim 1, wherein said surface active agent is at least one surface active agent selected from the group consisting of a nonionic surface active agent, an anionic surface active agent and an amphoteric surface active agent.

4. Ink for ink jet recording according to claim 1, wherein said surface active agent is a nonionic surface active agent.

5. Ink for ink jet recording according to claim 1, wherein the foaming surface viscosity of said ink is 0.1 to 0.7 g/s.

6. Ink for ink jet recording containing water, a coloring material and a water-soluble organic solvent, comprising:

0.01 to 5 wt % of a copolymer of a hydrophobic α, β-unsaturated ethylene monomer and a hydrophilic monomer having a plurality of —COOM groups (wherein M is hydrogen, an alkali metal, or an onium compound including ammonium ion, organic ammonium ion, phosphonium ion, sulfonium ion, oxonium ion stibonium ion, stanonium and iodonium, a monomer containing an acid anhydride thereof or a monomer containing an ester thereof; and 0.001 to 5 wt % of a surface active agent, wherein foaming surface viscosity of said ink is 0.1 to 1.0 g/s.

7. Ink for ink jet recording according to claim 6, wherein said hydrophilic monomer is maleic anhydride.

8. Ink for ink jet recording according to claim 6, wherein said hydrophobic monomer is styrene.

9. Ink for ink jet recording according to claim 6, wherein said copolymer is a copolymer selected from the group consisting of styrene-maleic anhydride, a hydrolysate of styrene-maleic anhydride, a salt thereof or an ester thereof.

10. Ink for ink jet recording according to claim 6, wherein mean molecular weight of said copolymer is 1000 to 10000.

11. Ink for ink jet recording according to claim 6, wherein mean molecular weight of said copolymer is 1000 to 3000.

12. Ink for ink jet recording according to claim 6, wherein the foaming surface viscosity of said ink is 0.1 to 0.7 g/s.

13. Ink for ink jet recording according to claim 6, wherein said surface active agent is a nonionic surface active agent.

14. Ink for ink jet recording according to claim 6, wherein the acid value in a case where all of said —COOM groups of said copolymer are replaced by —COOH or the acid value in a case where said acid anhydride is hydrolyzed is 100 to 500.

15. An ink jet recording method for recording data by discharging ink drops through orifices in accordance with recording signals, said ink jet recording method comprising the step of:

using ink for ink jet recording which contains water, a coloring material and a water-soluble organic solvent, 0.01 to 5 wt % of a polymer containing a carboxylic group or salt of a carboxylic group having an acid value of 50 to 700 and 0.001 to 5 wt % of a surface active agent, wherein the foaming surface viscosity of said ink is 0.1 to 1.0 g/s.

16. An ink jet recording method according to claim 15, wherein the quantity of ink which is discharged in response to one pulse is 1 to 10 ng.

17. An ink jet recing method according to claim 15, wherein a heating method is employed to discharge ink.

18. An ink jet recording method for recording data by discharging ink drops through orifices in accordance with recording signals, said ink jet recording method comprising the step of:

using ink for ink jet recording which contains water, a coloring material and a water-soluble organic solvent, 0.01 to 5 wt % of a copolymer of a hydrophobic α, β-unsaturated ethylene monomer and a monomer having a plurality of hydrophilic —COOM groups (wherein M is hydrogen, alkali metal, or an onium compound including ammonium ion, organic ammonium ion, phosphonium ion, sulfonium ion, oxonium ion, stibonium ion, stanonium and iodonium), a monomer having acid anhydride thereof or a monomer containing ester group thereof and 0.001 to 5 wt % of a surface active agent, wherein the foaming surface viscosity of said ink is 0.05 to 1.0 g/s.

19. An ink jet recording method according to claim 18, wherein a quantity of ink which is discharged in response to one pulse is 1 to 100 ng.

20. An ink jet recording method according to claim 18, wherein a heating method is employed to discharge ink.

21. Ink for ink jet recording according to claim 1, wherein the acid value ranges from 300 to 500, and the ink has a surface tension of 30 mN/m or higher.

22. Ink for ink jet recording according to claim 21, wherein the surface tension is 40 mN/m or higher.

23. Ink for ink jet recording according to claim 1, wherein the acid value ranges from 100 to 300, and the ink has a surface tension of 45 mN/m or lower.

24. Ink for ink jet recording according to claim 23, wherein the surface tension is 35 mN/m or lower.

* * * * *